US007685328B2

(12) United States Patent
Fruhauf et al.

(10) Patent No.: US 7,685,328 B2
(45) Date of Patent: Mar. 23, 2010

(54) GENERIC UNIVERSAL SERIAL BUS DEVICE OPERABLE AT LOW AND FULL SPEED AND ADAPTED FOR USE IN A SMART CARD DEVICE

(75) Inventors: Serge Fruhauf, Cupertino, CA (US); Robert A. Leydier, Orsay (FR)

(73) Assignees: STMicroelectronics, Inc., Carrollton, TX (US); Axalto (FR)

( * ) Notice: Subject to any disclaimer, the term of this patent is extended or adjusted under 35 U.S.C. 154(b) by 670 days.

(21) Appl. No.: 10/937,752

(22) Filed: Sep. 9, 2004

(65) Prior Publication Data
US 2006/0053244 A1 Mar. 9, 2006

(51) Int. Cl.
G06F 3/00 (2006.01)
G06F 13/00 (2006.01)
G06F 13/20 (2006.01)

(52) U.S. Cl. .............................. 710/11; 710/35; 710/58; 710/313

(58) Field of Classification Search .................. 710/11, 710/35, 58, 313
See application file for complete search history.

(56) References Cited

U.S. PATENT DOCUMENTS

| | | | |
|---|---|---|---|
| 5,974,486 A | 10/1999 | Siddappa ..................... 710/53 |
| 6,122,676 A | 9/2000 | Brief et al. ..................... 710/9 |
| 6,151,653 A | 11/2000 | Lin et al. ..................... 710/129 |
| 6,185,641 B1 | 2/2001 | Dunnihoo ..................... 710/56 |
| 6,343,364 B1 | 1/2002 | Leydier et al. .............. 713/500 |
| 6,370,603 B1* | 4/2002 | Silverman et al. ............. 710/72 |
| 6,439,464 B1 | 8/2002 | Fruhauf et al. .............. 235/492 |
| 6,467,042 B1 | 10/2002 | Wright et al. ................ 713/320 |
| 6,543,690 B2* | 4/2003 | Leydier et al. .............. 235/451 |
| 6,629,169 B2 | 9/2003 | Chu ............................ 710/72 |
| 6,654,817 B1 | 11/2003 | Huang ........................... 710/1 |
| 6,791,950 B2* | 9/2004 | Wu ............................. 370/257 |
| 6,883,718 B1* | 4/2005 | Le et al. ...................... 235/492 |
| 2002/0066791 A1 | 6/2002 | Leydier et al. .............. 235/492 |
| 2002/0103944 A1 | 8/2002 | Feuser et al. ................... 710/2 |
| 2002/0172203 A1* | 11/2002 | Ji et al. ........................ 370/392 |

(Continued)

FOREIGN PATENT DOCUMENTS

| | | |
|---|---|---|
| EP | 1246071 | 10/2002 |
| WO | 00/34878 | 6/2000 |
| WO | 02/23357 | 3/2002 |

OTHER PUBLICATIONS

"Universal Serial Bus Specification Revision 2.0" Apr. 27, 2000, http://www.usb.org/developers/docs.*
Compaq et al., Universal Serial Bus Specification, Sep. 23, 1998, Revision 1.1, pp. 18, 20, 33, 113, 134, 189.*

*Primary Examiner*—Alan Chen
(74) *Attorney, Agent, or Firm*—Lisa K. Jorgenson; Christopher F. Regan

(57) ABSTRACT

A USB device, integrated circuit, smart card and method are disclosed. A USB transceiver is connected to a data interface and operable at a respective low speed and full speed configuration. A processor as a USB device controller is operatively connected to the low speed USB transceiver and full speed USB transceiver and operable for transmitting a different device descriptor to a USB host for performing an enumeration depending on whether a low speed or high speed operation is chosen.

11 Claims, 4 Drawing Sheets

U.S. PATENT DOCUMENTS

| | | | |
|---|---|---|---|
| 2002/0184429 A1 | 12/2002 | Chang et al. | 710/313 |
| 2003/0018925 A1* | 1/2003 | Mohammad | 713/600 |
| 2003/0023804 A1 | 1/2003 | Matsuda et al. | 710/313 |
| 2003/0041205 A1 | 2/2003 | Wu et al. | 710/302 |
| 2005/0221894 A1* | 10/2005 | Lum et al. | 463/37 |
| 2005/0268129 A1* | 12/2005 | Julicher et al. | 713/322 |

* cited by examiner

GENERIC UNIVERSAL SERIAL BUS DEVICE OPERABLE AT LOW AND FULL SPEED AND ADAPTED FOR USE IN A SMART CARD DEVICE

FIELD OF THE INVENTION

This invention relates to the field of universal serial bus devices, and more particularly, this invention relates to universal serial bus devices operable in low and full speed operation and especially adapted for use in smart cards.

BACKGROUND OF THE INVENTION

Smart cards are plastic cards having an embedded Integrated Circuit (IC). That IC may be a logic circuit with its associated memories or a microcontroller with its associated memories and software, or a microcontroller with its associated memories and software coupled to a custom circuit block or interface.

To use the computing power of the IC, a smart card makes use of a full set of packaging technologies. For example, the die size varies from 1 $mm^2$ to 30 $mm^2$, but is limited because of the mechanical limitations imposed by the plastic construction of the smart card. The IC is attached to a lead frame and wire-bonding techniques are used to connect the IC pads to the lead frame contacts. Potting or other strengthening methods can be used to protect the IC against chemical and mechanical stresses during manufacturing and which are a part of everyday usage of a smart card.

Eight contacts are typically located on one side of the card. The smart card performs transactions with a smart card reader using a serial protocol. The mechanical and electrical specifications for a smart card are published by the International Standard Organization (ISO) as ISO7816-X standards, which have allowed the simple and mass produced magnetic stripe cards to evolve toward the smart card. This natural evolution has allowed smart cards, depending on the IC complexity, of course, to perform pre-paid accounting, cryptographic scheme, personal authentication using a PIN code, biometrics, and java scripts, for example.

ISO documents ISO 7816-1 Physical Characteristics, ISO 7816-2 Dimensions and Locations of the contacts, ISO 7816-3 Electronic signals and transmission protocols, ISO 7816-4 Interindustry Commands for Interchange, and ISO 7816-10 Electronic signals and answer to reset for synchronous cards are incorporated herein by reference.

In operation, smart card readers are recognized by the reader infrastructure or a host computer prior to performing any transaction involving a smart card. The infrastructure runs an application involving the smart card. The half duplex protocol between the smart card and the smart card reader, in which either the smart card sends information to the smart card reader or vice versa, cannot start until a smart card is in place and detected by the smart card reader. The infrastructure manages authentication or transactions for pre-paid cards in public telephony, for Bankcards in Point-of-Sale (POS) terminals and Automatic Teller Machines (ATM), for Pay TV providers in set top boxes, and for wireless telecom operators in Subscriber Identification Modules (SIM) used in Global System for Mobile (GSM) terminals. Except for SIM cards, all other smart card reader applications use a physical sensor to detect the smart card. This sensor tells the smart card reader when a smart card is in place, i.e., when the smart card lead frame contacts mate with the smart card reader contacts.

When the smart card reader has established that a smart card is in place, a power-up sequence begins. After this power-up sequence has finished, the smart card reader typically provides a clock to the smart card and releases a reset signal. The smart card then executes its stored Operating System (OS). The SIM card, on the other hand, is in place only once with the power-off and used constantly subsequent to its positioning.

The first application for smart card technology was the public telephone system. The smart card die size was typically less than 1 $mm^2$, and only memories and logic circuits were integrated in the IC. The smart card reader used all eight contacts to interface properly with the different smart card generations. When the smart card was inserted in the payphone, the telephone infrastructure authenticated the smart card and the telephone removed accounting "units" from the smart card.

The banking industry subsequently adopted smart cards. The die size was about 10 $mm^2$, and a microcontroller and its associated memories and software were integrated in the IC. The smart card reader used up to six contacts to interface properly with the different smart card generations. When a smart card was inserted in the ATM or the POS (point-of-sale), the smart card user was authenticated with a PIN code. The smart card could store different items, such as the balance of cash received from an ATM on a per week basis or details of purchases since a last closing date. Based on this information, authorization could be issued on the spot once the PIN had authenticated the debtor. This was accomplished without telephone calls to the bank.

Another application for smart cards has been developed by GSM manufacturers. The die size in a SIM is about 30 $mm^2$, and a microcontroller and its associated memories and software are integrated in the IC. The SIM reader uses five contacts to interface properly with the smart card. The more sophisticated smart card applications are performed in GSM using Java applets.

A new market for the smart card has emerged with the growth of the internet accessed from a personal computer. Secure message, Public Key Infrastructure, Authentication and Electronic Payment are new smart card areas of interest. The smart card acts as an e-commerce facilitator. One advantage of a smart card compared to other solutions is the smart card PIN located in its memory that is never communicated in any transaction.

Presently, a smart card is inserted into a smart card reader connected to a host computer. Two protocols are involved in supporting transactions between the smart card and host computer. The first protocol complies with the ISO-7816-3, which provides detailed requirements for the serial interface between smart card and smart card reader. The reader is connected to the computer via a serial port, a parallel port, or the Universal Serial Bus (USB), using a second protocol. The smart card reader contains electronic circuits and embedded software that enable communication between the smart card using the first protocol and the host computer using the second protocol. The host computer is loaded with any appropriate drivers to support the smart card reader.

Many countries have begun to use the smart card in the PC environment. The die size used in these applications ranges from 5 $mm^2$ to 30 $mm^2$, and the microcontroller and its associated memories and software are integrated in the IC typically with a cryptocontroller. Sometimes, a bio-sensor is integrated. The smart card reader uses at least five contacts to interface properly with the smart card in these applications.

Since the late 1990's, the universal serial bus (USB) has become firmly established and has gained wide acceptance in the PC marketplace. The USB was developed in response to a need for a standard interface that extends the concept of "plug and play" to devices external to a PC. It has enabled users to install and remove external peripheral devices without opening the PC case or removing power from the PC. The USB provides a low-cost, high performance, half-duplex serial interface that is easy to use and readily expandable.

USB uses four wires. The power supply is carried with two wires ($V_{BUS}$ and ground), and data is carried with the other two wires (D+, D−). Different versions of the USB are available, including the current Universal Serial Bus Specification, Revision 2.0, written and controlled by USB Implementers Forum, Inc., a non-profit corporation founded by the group of companies that developed the USB Specification and is incorporated herein by reference. A previous version is USB specification 1.1, the disclosure which is also incorporated by reference in its entirety. The increasingly widespread use of the USB has led smart card reader manufacturers to develop USB interfaces for connection of their products to host computers to complement the existing serial and parallel interfaces.

Applications compliant with the older USB 1.1 specification have the choice to use a low speed (1.5 Mb/s) or a full speed 12 Mb/s device. Low speed is usually chosen for low cost or lower performance reasons. However, as the specification evolves towards high speed, USB 2.0 (480 Mb/s) it could be necessary for these existing applications to perform at the full speed specification. In fact, the USB 2.0 specification is for high speed and is backward compatible with the full speed USB, not with the low speed USB. Therefore, it would be ideal to offer the possibility to operate in low speed, for legacy reasons, or full speed.

SUMMARY OF THE INVENTION

It is therefore an object of the present invention to provide a USB device operable at a low speed, for legacy reasons or full speed, in a manner that is efficient and adaptable for use with the smart card devices.

In accordance with the present invention, a USB device includes a low speed USB transceiver and a separate full speed USB transceiver connected to a data interface and operable at a respective low speed and full speed configuration. It is possible to reduce the transceiver low speed or full speed to a CMOS buffer, as a chip-to-chip without USB cable. A processor is operatively connected to the low speed USB transceiver and the full speed USB transceiver and operable for transmitting a different device descriptor to a USB host for performing an enumeration, depending on whether a low speed or high speed of operation is chosen. The USB device, also called a USB peripheral, chooses the speed at which it wants to operate by the host depending on the embedded application loaded in the memory of the CPU of the USB peripheral.

The serial interface engine is operatively connected to the low speed USB transceiver and full speed USB transceiver and operable in either the low or full speed. A USB device controller and CPU are operable together, forming the processor capabilities for the entire device. The processor is also operable for allowing the reception of a GetDescriptor request for uploading a different response depending on the speed of the device and configuring an endpoint0 and control transfer when the low speed USB transceiver is enabled. The processor is also operative for configuring an endpoint0 and control transfer and operable at a full speed to send its configuration to a USB host, transferring about 8 bytes maximum and a bidirectional pipe at a low speed of about 6 MHz clock speed, and configuring two end points in and out for bulk transfer of data at irregular intervals. The bulk transfer of data is about 64 bytes maximum at about 48 MHz clock speed. The data interface also comprises two data interface (D+, D−) and the low speed transceiver and full speed transceiver are operatively connected to the two data interfaces. In the case of chip-to-chip without USB cable, it can be the same buffer for low speed and full speed and the data interface can comprise also one or two data interfaces, D+, D−. The USB device also includes a generic application bus through which a device descriptor is uploaded. The low speed comprises a default configuration during initial power-on. A clock circuit has a programmable source for switching from a low speed clock specification to a full speed clock specification and the USB device comprises a smart card.

In yet another aspect of the present invention, the USB device includes a data interface comprising at least one D+ and D− terminal. An integrated pull-up resistor circuit has pull-up resistors operable with respective D+ and D− terminals. A programmable universal serial bus device controller (UDC) is operatively connected to the low speed USB transceiver and full speed USB transceiver and integrated pull-up resistor circuit and operable for configuring a low speed operation as a default, disconnecting a pull-up resistor on D−, connecting a pull-up resistor to D+, and transmitting a different device descriptor after reset to a USB host for performing an enumeration for full speed operation.

A method of operating a USB device and integrated circuit are also disclosed. In one aspect of the invention, the method comprises the step of transmitting a different device descriptor to a USB host for performing an enumeration depending on whether a low speed or full speed of operation is chosen.

A smart card of the present invention is also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention is advantageous and allows the control of the attachment or detachment process of the USB by using control logic on the USB device, allowing a transmission to the host of a different device descriptor, depending on the chosen speed. The present invention allows a programmable device to change its configuration, depending on the speed chosen, when it attaches to the USB host. The USB device core includes a USB device controller (UDC) and programmable configuration circuit that are compatible with two operating modes or programmable with respect to the different configurations. The USB device core includes a serial interface engine (SIE), which can be identical in low or full speed. The endpoint buffer depends on the size of the data to be transmitted and the number of an endpoint. A generic application bus/bridge logic layer interfaces with the main control logic, similar to a microcontroller, as an example. Thus, controlling the logic and configuration of the USB device core from the microcontroller allows the design of a "programmable" USB device core. The USB device core sends to the application logic a GetDescriptor request to upload a different response depending on the speed of the device, instead of decoding the request itself.

Figure 1:
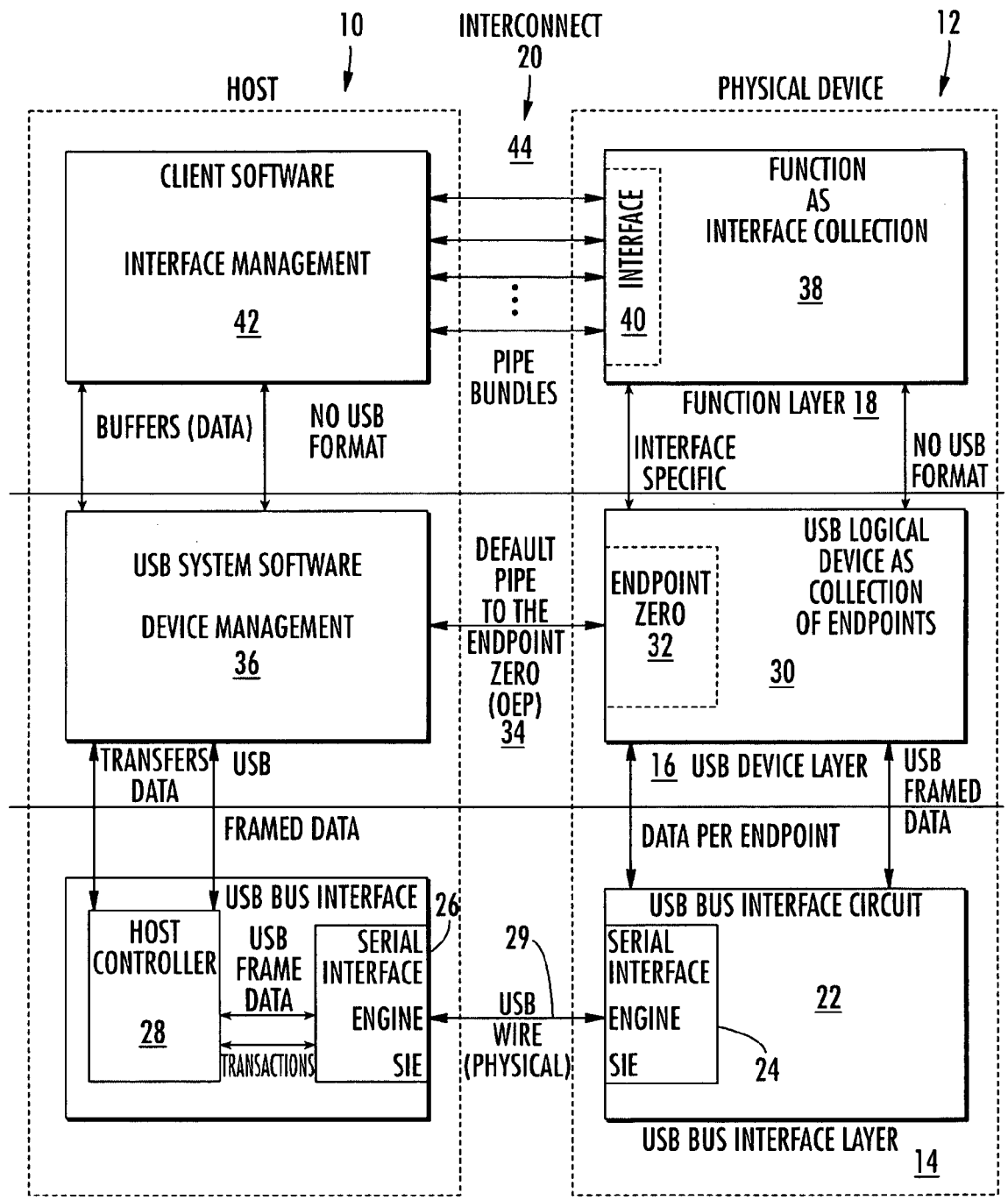
FIG. 1 is a block diagram of a USB host/device showing various transport mechanisms, pipes, and the USB-relevant format of transported data between the host and interconnected physical device as used in the Universal Serial Bus specification.

For purposes of background and reference, the basic USB data flow between a USB host and a USB device and the various implementations and layers in accordance with Universal Serial Bus specification are set forth in FIG. 1.

As shown in FIG. 1, the connection of a host 10 to a physical device 12 requires the interaction between different layers, i.e., the USB bus interface layer 14, USB device layer 16, and function layer 18. An interconnect 20 between the host and device is illustrated.

The USB bus interface layer 14 includes a USB bus interface circuit 22 and serial interface engine (SIE) 24 at the device 12 that communicates with a serial interface engine (SIE) 26 and its host controller 28 at the host 10 via a physical wire 29. The USB device layer 16 includes at the physical device 12 a collection of endpoints as a USB logical device 30. An endpoint zero 32 is operable in communication via the default pipe 34 to USB system software 36 that is operable for device management at the host 10. The function layer 18 includes at the physical device 12, a logical function 38 as an interface collection, and the interface 40 that communicates via a plurality of pipe bundles 44 to client software 42 that is operable for interface management.

The USB bus interface layer 14 provides the physical wire 29 for the traffic signaling and packet conductivity between the host 10 and physical device 12. The USB device layer 16 views the USB system software 36 to perform generic USB operations with the physical device 12 via the default pipe 34 to endpoint zero 32. The functional layer 18 adds capabilities to the host using matched client software. The USB Device Layer 16 and Function Layer 18 each view logical communications within their layers and use the USB Bus Interface Layer 14 for any data transfer. The USB host 10 coordinates the overall USB system, controls access, and monitors the USB topology.

Logical communications exist between the client software and the Function Layer 18 and the USB system software 36 and USB logical device 30. Actual packets flow between the USB host controller 28 and the USB bus interface circuit 22.

As is known, USB physical devices add functionality to the host and have the same interface. Each physical device carries and reports configuration-related data, which it forwards to the host to allow the host to identify and configure the USB device. Typically, devices on the USB are connected to a host using a tiered star topology, including the hub. The host, on the other hand, communicates with each logical device as if it were directly connected to a root port. The client software manipulates a USB function interface of a device only as an interface of interest.

It should be understood that the actual communication flows across several interface boundaries. The two software interfaces for the host are a host controller driver (HCD) and a USB driver (USBD). A software interface between a USB host controller 28 and USB system software 36 implements the host controller driver and allows the host controller to implement functions without requiring the host software to be dependent on any particular implementation. One USB driver can support different host controllers. Specific knowledge of a host controller implementation is not required.

The USB logical device 30 can be considered a collection of endpoints and are grouped into endpoint sets to implement the interface. The USB system software 36 manages or controls the device using the default pipe 34 to the endpoint zero 32. Client software 42 manages the interface using pipe bundles 44 associated with an endpoint set. Data is moved between a buffer on the host 10 and an endpoint on the USB device 12 when client software requests the data. The host controller 28 or USB device 12, depending on the direction of data transfer, packetizes the data and forwards the packets over the bus. It also coordinates bus access. The host communicates with the physical device using a desired communication that is designed to match any communication requirements of the physical device and transfer characteristics provided by a USB.

The endpoint is an identifiable portion of the device that terminates the communication between the host. It can be a collection of independent endpoints. Default control uses input and output endpoints and the endpoint number "zero" as part of the default pipe 34.

The data transport mechanism includes transfers of data between the host controller 28 and the USB system software 36 at the host 10. Buffers can be used as a data transport mechanism between the USB system software 36 and the client software 42 at the host 10. The other data transport mechanism includes transactions between the host controller 28 and the serial interface engine 26 within the USB bus interface of the host.

The data transport mechanism also exists as a data per endpoint between the USB bus interface circuit 22 and the USB logical device 30 at the physical device 12. The data transport mechanism between the function 38 (and with the interface 40) and the endpoint zero 32 is interface-specific.

USB-relevant format of transported data occurs as USB frame data between the serial interface engine 26 and the host controller 28 and between the host controller 28 and the USB system software 36 at the host 10. No USB format of transporting data exists between the client software 42 that manages an interface and the USB system software 36.

At the device 12, USB-relevant format of transported data exists as USB frame data between the USB bus interface circuit 22 and the USB logical device 30. No USB format of data occurs between the interface 40 and the endpoint zero 32 at the device 12.

Further details of the functioning of the USB host and device and data flow can be found in the Universal Serial Bus specification, Chapter 5 entitled, "USB Dataflow Model," the disclosure which is hereby incorporated by reference in its entirety.

There now follows a brief description of using USB with a generic smart card device to enhance understanding of the present invention. In accordance with the USB Specification, the host device operates as the master of the system bus, and all of the USB devices connected to the system bus operate as slave devices. A USB system bus includes two data lines D+ and D−, over which differential serial data signals are transmitted. Moreover, the USB system bus also includes a power line $V_{BUS}$ which may be used to provide an operating voltage from the host device to USB devices without their own source of power, as well as a ground line.

Accordingly, upon connection to the system bus, a USB smart card will receive power from the power line $V_{BUS}$ which will cause its processor to initialize and announce its presence so that the host device will recognize the device. This is done by connecting a predetermined voltage (e.g., 3.3 V) as an attachment signal to one or both of the data lines D+, D− via a respective pull-up resistor depending upon the data transfer speed at which the smart card is to operate. In particular, the USB Specification defines three data transfer rates, namely low speed (1.5 Mb/s), full speed (12 Mb/s), and high speed (480 Mb/s).

Generally speaking, once the USB smart card is recognized by the host device, the smart card will send information identifying itself and its capabilities to the host device when prompted. This information is incorporated within various descriptors, namely device descriptors, configuration descriptors, interface descriptors, endpoint descriptors, and (optionally) string descriptors. Further information on USB descriptors may be found in the USB Specification. The host device will interpret this data using an appropriate driver and inform the smart card what configurations and system resources it will be allotted during the current session. The smart card uses this information to enumerate itself for use in the system.

One particularly advantageous approach for managing pull-up connections to differential data lines is disclosed in U.S. application Ser. No. 2002/0066791 to Leydier et al., and which is hereby incorporated herein in its entirety by reference. In particular, this application is directed to a smart card which has an IC with voltage conditioning circuitry and a pull-up resistor. The smart card, when inserted in a smart card adapter coupled to a host device, is capable of signaling the host device over a bus using the integrated pull-up resistor selectively coupled to a voltage output of the voltage conditioning circuitry and a first output of the smart card.

The voltage conditioning circuitry output is selectively coupled to the first output through a resistor responsive to the device being powered by the bus (but not transmitting). This tends to pull up the first output to the voltage level of the voltage source, which makes the smart card capable of being properly detected by the host device upon the bus being driven by a host. Selectively disconnecting the pull-up resistor while the smart card is transmitting or receiving results in a more balanced differential output signal. Since the pull-up resistor and voltage conditioning circuitry supplying the proper voltage to the pull-up resistor are an integrated part of the IC, no separate contact is required to supply voltage to the resistor. This permits the smart card to be compatible with the contact configuration of certain existing smart cards, and eliminates the need for the pull-up resistor or voltage conditioning circuitry to be included in the smart card adapter.

Moreover, the device may also be detached from the system bus for other reasons. For example, the device may be detached to perform a re-enumeration, to conserve power, to reduce communications overhead processing by the host device, or when the $V_{BUS}$ power supply is not within the range specified by the USB Specification.

Because of the enhanced functionality afforded by the USB Specification and the significant computing power which may be included in USB smart card integrated circuits, it is possible not only to support multiple applications with a smart card, but also multiple configurations, such as endpoint configurations, for example. An example of a USB device which supports two different endpoint configurations is disclosed in U.S. Pat. No. 6,122,676 to Brief et al. In particular, this patent is directed to a USB device, which includes two mappings for relating a received token to an endpoint pipe. A host controller selects which of the two mappings the USB device will use during initialization or enumeration, and the host controller can also cause the USB device to change between the two configurations during operation.

Figure 2:
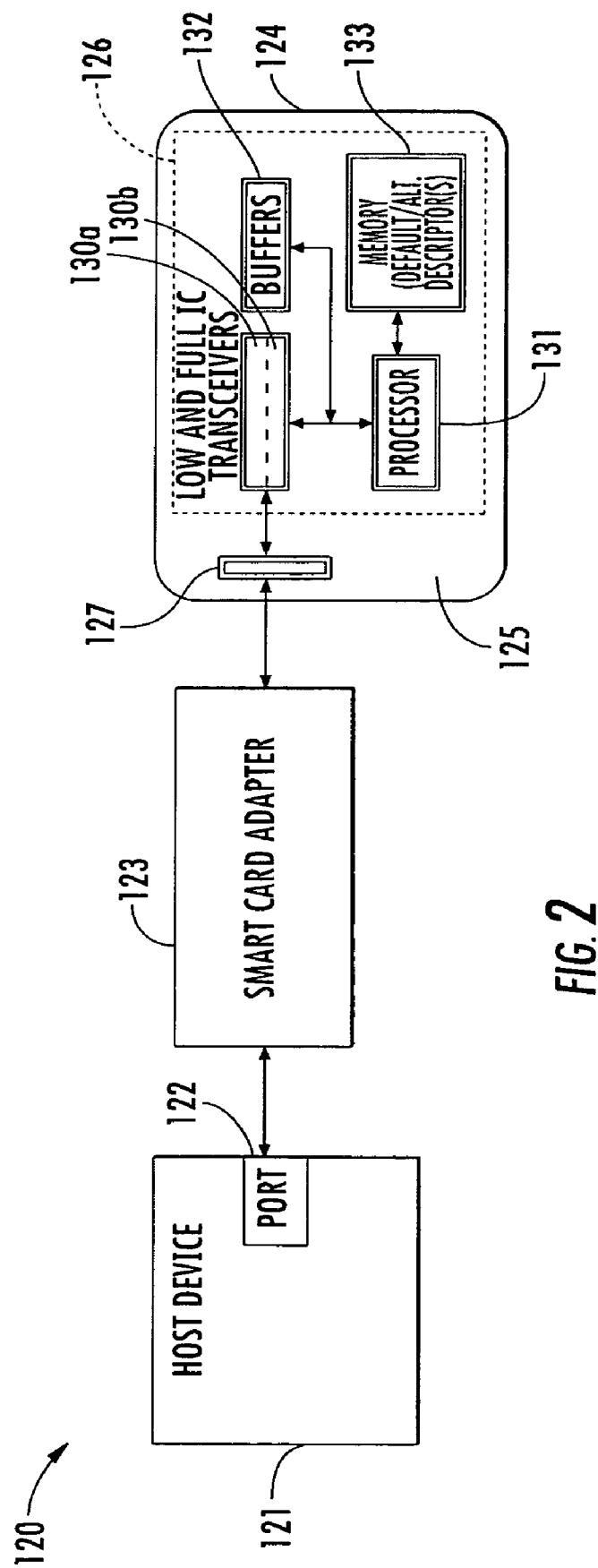
FIG. 2 is a schematic block diagram of a smart card system that can be modified for use with the present invention.

Referring initially to FIG. 2, a smart card system 120 is described, including basic components that could be used for the present invention. The smart card system is described relative to USB, but the card could be a dual mode smart card operative in both ISO and USB mode. The smart card illustratively includes a host device 121 having a communications port 122, a smart card adapter or adapter 123 connected to the communications port, and a smart card 124 to be read by the smart card adapter. Generally speaking, the host device 121 will be a computer of some type, which could be a personal computer (PC), laptop, etc., for example.

Of course, smart card systems take many forms, so the host device 121 could be any number of computing devices capable of interfacing with a smart card, such as a cable or satellite television receiver/decoder, an automated teller machine (ATM) or other banking machine, a point-of-sale (POS) device (e.g., a cash register), etc., depending upon the given application. Another example would be a personal data assistant (PDA) or other USB device that is ordinarily a slave to a USB bus master (i.e., host), but when used in a USB on-the-go (OTG) mode can itself act as a limited USB bus master.

In an ISO 7816 mode, the port 122 may be a serial communications port connected to the internal system bus of the host device 121 (not shown). In the case of a USB mode, the port 122 will be a USB port, which is also connected to the internal system bus of the host device 121, as will be appreciated by those of skill in the art. The smart card system 120 may advantageously be in a USB system or a dual mode system which operates in both modes, for example, similar to the system described in U.S. Pat. No. 6,439,464 to Fruhauf et al., assigned to the assignee of the present invention, and which is hereby incorporated herein in its entirety by reference. Of course, other suitable smart card formats may also be used, as will be appreciated by those of skill in the art.

The smart card adapter 123 is of a type compatible with the particular operational protocol being implemented in the system 120 (e.g., a USB type card reader). Typically, the smart card adapter is a passive ISO 7816 contact circuit with a fixed USB cable that plugs into a USB port 122. Of course, multiple adapters 123 may be used, as well as multi-purpose readers, which read more than one type of smart card or multi-mode smart cards. In addition, the card reader 123 can be remotely located with respect to the host device 121, but it need not be. That is, in some embodiments the card adapter 123 can be incorporated within the host device 121 or carried by a housing thereof, as will be appreciated by those of skill in the art. Additionally, in some embodiments the smart card adapter 123 may be incorporated into a smart card integrated circuit chip (see below), reducing the "reader" to little more that a "pass through" connector.

The smart card 124 illustratively includes a card body 125 and an integrated circuit (IC) 126 carried by the card body. Further, the smart card also illustratively includes contacts 127 for providing an electrical connection between the smart card adapter 123 and the IC 126. Of course, it will be appreciated that in some embodiments the smart card 124 may be wireless and thus not require the contacts 127. In such event, an antenna may be used instead of the contacts 127, for example. Thus, the use of physical contacts 127 on the card body 125 (and corresponding contacts at the card reader 123) will be assumed for purposes of the present discussion.

It should be noted that the smart card body 125 may be made of various types of materials and take various shapes. Perhaps the most common material used for smart cards is plastic, but other suitable materials may also be used. Moreover, smart cards are also generally rectangular in shape and thin enough to fit in a wallet, similar to a credit card, but again, other shapes and thicknesses may be used. The IC 126 may be encased within the card body 125, as illustratively shown, or it may be recessed therein but still exposed. Other mounting configurations are possible, as will be appreciated by those of skill in the art, which are anticipated by the present invention. It should also be noted that the smart card 124 may be incorporated or built into another device as a token or identification circuit therefor, for example.

More particularly, the IC 126 illustratively includes two separate transceivers 130a, 130b, which are connected to the contacts 127 and sends/receives signals to/from the host device 121 via the smart card adapter 123. The first transceiver 130a is a low speed USB transceiver and the second transceiver 130b is a high speed USB transceiver. The transceivers 130a, 130b are controlled by a processor 131 which also performs the various smart card operations. Furthermore, buffer circuitry 132 can be included within the IC 126 for buffering signals transmitted between the IC and the host device 121. The memory 133 could include various descriptors and associated USB protocol data. The circuitry could include random access memory (RAM) and non-volatile memory. The memory can include various look-up tables. It should be understood, however, that one transceiver could be used capable of working at low speed and/or full speed. For those applications that may use a chip-to-chip without USB cable, the transceiver can be reduced to a simple CMOS buffer input/output with the rise and fall time independent of the speed.

Figure 3:
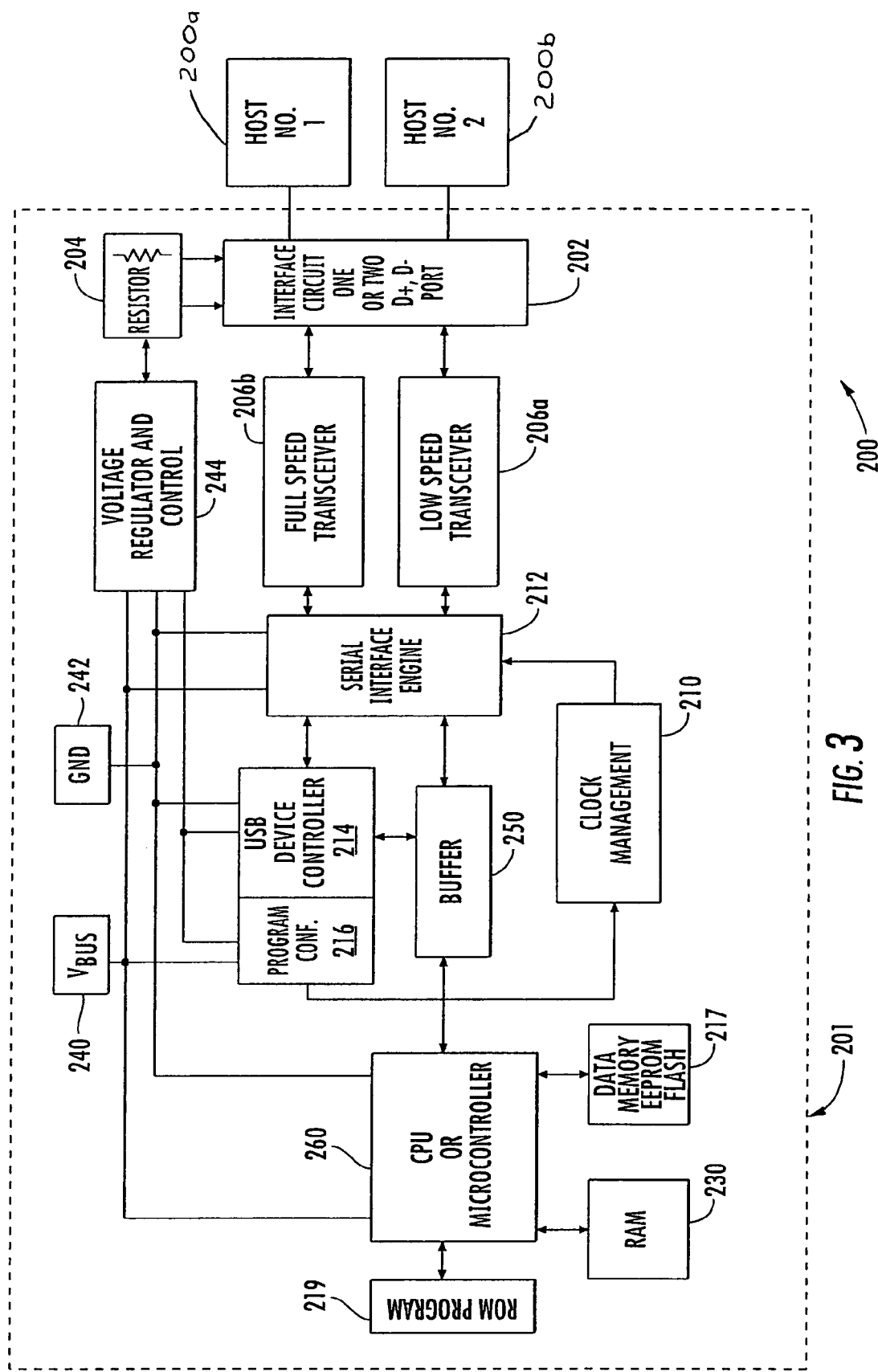
FIG. 3 is a schematic block diagram illustrating a smart card integrated circuit that can be used for the present invention.

Referring now to FIG. 3, there is illustrated a block diagram of a USB device 200 that can be adapted for use as a USB smart card system for use with the present invention and showing basic components. As illustrated, two hosts 200a, 200b are shown connected to a USB interface circuit 202, which could include one or two separate USB ports having appropriate D+ and D− terminals. When using two ports, it is possible to include D+, D− only. The interface circuit 202 and other components of the USB device 200 are typically part of one integrated circuit 201 shown by dashed lines. As illustrated, an integrated pull-up resistor circuit 204 is connected to the interface circuit. This pull-up resistor circuit 204 includes appropriate pull-up resistors that can be connected on D+ or D− or both terminals. Two separate transceivers are illustrated, i.e., a low speed transceiver 206a and a full speed transceiver 206b. These transceivers 206a, 206b can be connected to one or two separate USB ports (D+, D−). In the illustrated embodiment, the two transceivers 206a, 206b are each shown connected to the USB port formed by the interface circuit 202. Of course, one or two USB ports could be used, and it is possible that each respective transceiver can be connected to a respective USB host. Only one host at a time can communicate to one of the USB ports because there is only one USB device controller on the chip.

An internal clock management circuit 210 is operable with a serial interface engine 212 and associated USB device controller 214, for example, a processor, forming part of the USB device core, which is programmable from a programmable configuration 216, which can be downloaded from a data memory 217 through a buffer interface 250 by a CPU 260. The CPU 260 could be a microcontroller and the data memory 217 could be an EEPROM flash memory. The clock management circuit 210 is preferably an internal clock, but it should be understood that an external clock can be used. The programmable configuration circuit 216 operable with the USB device controller 214 could be a processor or FPGA or other programmable source function for configuring low or full speed clock signals.

In operation, the system uploads a USB device descriptor through a generic USB application bus between components. A control object allows an attachment or detachment of the USB device from the USB host. The CPU 260 could incorporate control logic and be operable with stored program circuit in ROM 219.

Other components include a RAM memory 230, for example, the illustrated random access memory (RAM). This memory could also be an Electrically Erasable Programmable Read-Only Memory (EEPROM) or other memory. Any RAM could be used for temporarily storing data to be processed and can be used for storing look-up tables for allocating data to respective smart card applications. Any non-volatile memory could be used for storing permanent and/or semi-permanent information to be retained by the integrated circuit when not connected to (and powered by) the smart card adapter. This type of information could include device descriptors, configuration descriptors, interface descriptors, endpoint descriptors, string descriptors, supported USB requests, and similar items. Power terminals can be connected to the $V_{BUS}$ and $V_{GND}$ terminals 240, 242 of a system bus. A voltage regulator and control circuit 244 is connected to the $V_{BUS}$ and $V_{GND}$ lines and the pull-up resistor circuit 204 for providing appropriate voltage levels, for example, around 3.3 volts at the data terminals as an attachment signal for recognition of the smart card by the host device.

Because of the requirements of rise and fall time, jitters, and the eye diagram being different between low speed and full speed devices, the dual speed USB device of the present invention requires two separate transceivers. The present invention is different from a downstream port of a USB hub that supports both low and full speed with the same transceivers. The differences for the device are due to a different USB cable. In this description of the present invention, a USB port as an interface circuit 202 is connected to the two transceivers 206a, 206b and the USB device controller 214 operable with other components enSables the transceiver to match the chosen speed.

It is also possible that some applications may require two USB ports in the interface circuit 202, for example, one low speed and one high speed, connected to two different USB hosts as illustrated in FIG. 3.

Changing speed in the present invention requires that the clock management circuit 210 of the USB device also has to change. To operate adequately in USB, low speed requires a 6 MHz clock and full speed requires a 48 MHz clock. The USB device controller 214 responsible to attach or detach the USB device can also control the clock management circuit 210 for the USB device core. This source can be external or generated internally depending on the application, the power consumption, or the cost requirements. In the illustrated embodiment shown in FIG. 3, an internal clock is shown.

After the "attach" process, a host transmits to the USB device commands to reset the device and identify the functional requirements of the device. This second step is called enumeration of the device.

A single configuration describes a set of endpoints and interface requirements. The endpoint is characterized by an endpoint number and the transfer characterizations. The interface consists of the interface unique identification or interface number and a set of endpoints.

The format to retrieve this information from the USB device is called the "descriptor." There is only one device descriptor per device. It is used to describe device identification, the number of configurations and default pipe attributes. A device can have several configuration descriptors. Each reports the power requirements and the number of interfaces it includes. There are other descriptors that allow the host to identify the functional requirements of the USB device when it sends the GetDescriptor, GetConfiguration, GetInterface, GetStatus request to the device. Examples of configuration that can be used in the present invention include:

In low speed: endpoint0 can be used to control transfer, to configure, to initialize the device, the interface, and the endpoint, and to send data of 8B maximum in a bi-directional pipe.

In full speed: Bulk transfer can be used to transfer large amounts of data (64B max.) at irregular intervals with two endpoints IN and OUT.

An interrupt transfer can be used to transfer small amounts of data at irregular intervals, but at a guaranteed time, with one endpoint to interrupt the host by example.

In the present invention, the control of the attach or detach process by control logic on the USB device, allows the device to send to the host a different device descriptor, depending on the chosen speed. This feature allows the programmable device of the present invention to change its configuration depending on the chosen speed when it attaches to the USB host. To enable this reconfiguration, the present invention uses a USB device core that is compatible with the two operating modes or programmable in respect to the different configurations.

As noted before, the USB device core of the present invention includes a Serial Interface Engine (SEI) 212, which can be identical in low or full speed, an endpoint buffer, which depends on the size of the data to transmit and the number of the endpoint, and a generic application bus/bridge logic layer to interface with the main control logic. Controlling this logic and configuration of the USB device core from the CPU/microcontroller 260 or similar circuit or functional block allows a "programmable" USB device core. This also requires that this programmable USD device core send to the application logic the GetDescriptor request to upload a different response depending on the speed of the device, instead of decoding the request itself.

In a non-limiting example of the present invention, the minimum configuration for a low speed device consists of the endpoint0 and the control transfer. This mode is also used by all full speed devices to send its configuration to the USB host.

Figure 4:
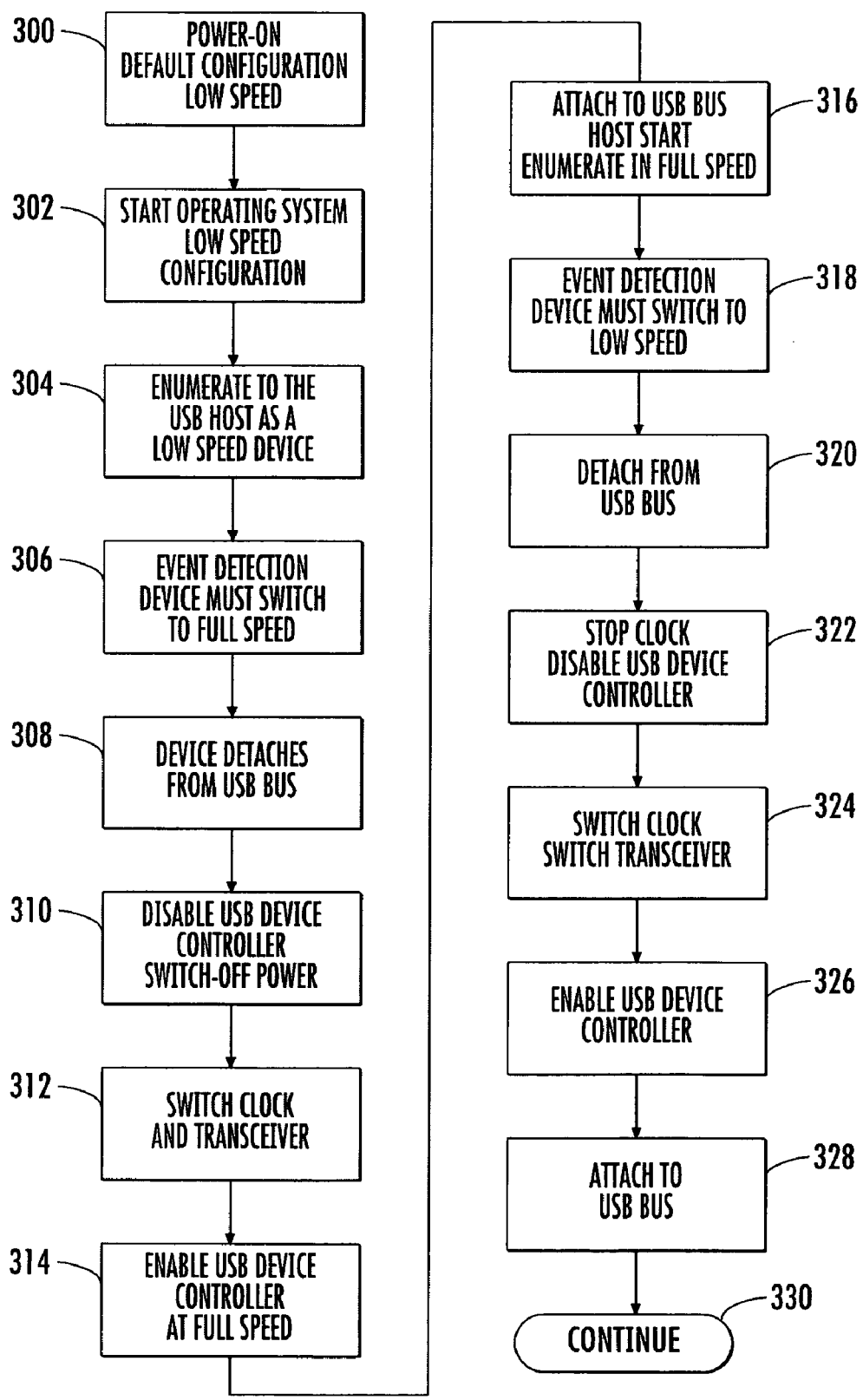
FIG. 4 is a flow diagram illustrating methods for operating a generic USB device in accordance with one example of the present invention.

A flow chart illustrating basic aspects of the method of the present invention is shown in FIG. 4. In one aspect of the present invention at power-on, the low speed configuration is chosen to be the default configuration when the device is first powered-on (block 300). The operating system begins in low speed configuration (block 302). It declares itself, i.e., enumerates, as a low speed device to the host by connecting the pull-up resistor to D- (block 304) and the host begins its processing for enumeration of this low speed device. It operates in compliance with the USB 1.1 specification, in one non-limiting example.

An event can occur and be detected, indicating that the integrated system, on-chip, needs to switch to a full speed mode (block 306). At this time, the system declares a "detach" from the USB host by disconnecting the pull-up resistor on D- and detaching from the USB bus (block 308). The USB device controller is disabled and the controller switches off power (block 310). The system prepares the device for a new attachment as a full speed device and switches the clock as part of the clock management circuit and switches the transceiver (block 312). The USB device controller is enabled at full speed (block 314). The pull-up resistor is connected to D+. The transceiver is switched and the device prepares to start the USB on the full speed clock specification (48 MHz). The USB bus is attached to enumerate in full speed. The logic of the USB device core has been set to the right speed set-up.

The host starts a new enumeration process and the control logic sends through the application bus of the USB device core a new set of descriptors to operate in full speed (block 316). An event detection occurs and the device must switch to low speed (block 318). To return to a low speed mode, the system detaches from the USB bus (block 320). The clock is stopped and the USB device controller disabled (block 322). The clock and transceiver are switched (block 324). The USB device controller is enabled (block 326) and attaches the device to the USB host (block 328). The process will continue as events occur requiring a change in speed (block 330). For simplicity of this description, only one USB host is described, but two USB hosts with two separate ports on the device are also applicable to the present invention.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method of operating a smart card device, comprising; connecting a USB host device as a master to a USB smart card device via a smart card reader that is coupled to the host device for reading the smart card device and including a USB bus, wherein the smart card device comprises an integrated circuit comprising D+ and D- ports forming an interface circuit, a single serial interface engine that translates USB data into parallel data, a low speed USB transceiver and separate full speed USB transceiver connected in parallel between the serial interface engine and the interface circuit, a processor, a data memory storing programmable USB configurations and connected to the processor, a USB device controller coupled to the serial interface engine and processor and a buffer connected between the processor, USB device controller and serial interface engine through which programmable configurations are loaded to the USB device controller and serial interface engine, and a clock source coupled to the processor, serial interface engine and USB device controller for switching clock speed operation for a low speed clock speed or a full speed clock speed;

attaching to the USB host device and USB bus and powering-on the USB smart card device, low speed in a default configuration by powering the low speed transceiver only and the clock source in a low speed configuration;

enumerating to the USB host device as a low speed USB smart card device and operating as a low speed device;

detecting an event indicative that the USB smart card device should switch to a full speed mode;

detaching from the USB host device and USB bus;

disabling the USB smart card device by switching off power to the USB device controller;

switching the clock source to a full speed clock speed and switching out from the low speed transceiver operation and enabling full speed transceiver operation; and attaching to the USB bus and enumerating to the USB host as a full speed USB smart card device while the USB host device sends a new set of descriptors to operate in full speed.

2. method according to claim 1, and further comprising detecting subsequent events and switching between full and low speed operation as necessary by disabling the USB smart card device and switching the clock circuit and transceiver operation as necessary for low or full speed operation and reattaching.

3. method according to claim 1, and further comprising operating the USB smart card either a USB or ISO mode.

4. method according to claim 1, and further comprising reading the smart card through a pass through connector that is incorporated within the smart card device.

5. method according to claim 1, and further comprising enumerating as a low speed USB device to the USB host by connecting at least one pull-up resistor to the D−port of the interface circuit.

6. method according to claim 1, and further comprising detaching from the USB host by disconnecting at least one pull-up resistor to the D− port and detaching from the USB bus.

7. method according to claim 1, and further comprising transmitting a GetDescriptor request for uploading a different response depending on the speed of the device.

8. method according to claim 1, and further comprising configuring an endpoint0 and control transfer when the low speed USB transceiver is enabled.

9. method according to claim 1, and further comprising configuring an endpoint0 and control transfer for sending a configuration to a USB host during high speed operation.

10. method according to claim 1, and further comprising configuring two endpoints In and Out for Bulk transfer of data at irregular intervals.

11. method according to claim 1, and further comprising updating a device descriptor using an application bus.

* * * * *